United States Patent [19]

Dion

[11] Patent Number: 4,869,584

[45] Date of Patent: Sep. 26, 1989

[54] LOUVERED SUNGLASSES

[76] Inventor: Peter R. Dion, 113 Allen Ave., Winter Haven, Fla. 33880

[21] Appl. No.: 255,439

[22] Filed: Oct. 11, 1988

[51] Int. Cl.⁴ .......................... G02C 7/16; G02C 1/00
[52] U.S. Cl. ...................................... 351/45; 351/46; 351/158
[58] Field of Search ...................... 351/44, 45, 46, 50, 351/158; 2/14

[56] References Cited

U.S. PATENT DOCUMENTS 3,058,392 10/1962 Primeau ............................ 351/50 X Primary Examiner—Rodney B. Bovernick
Attorney, Agent, or Firm—William M. Hobby, III

[57] ABSTRACT

A pair of louvered sunglasses includes a frame having a front piece with a pair of lens openings therein and a pair of temples attached to the front piece. A plurality of elongated louvers are horizontally mounted in each front piece opening and rotatably supported in each vertical edge of the front piece. Each louver has a small shaft on each end riding in an opening along each vertical edge of the frame front piece and each louver has an arm protruding therefrom and each arm of each louver in each opening being connected by a connecting member. The connecting member is connected to a rotating shaft passing through the top of the frame front piece so that rotating the shaft rotates all of the louvers simultaneously.

7 Claims, 1 Drawing Sheet

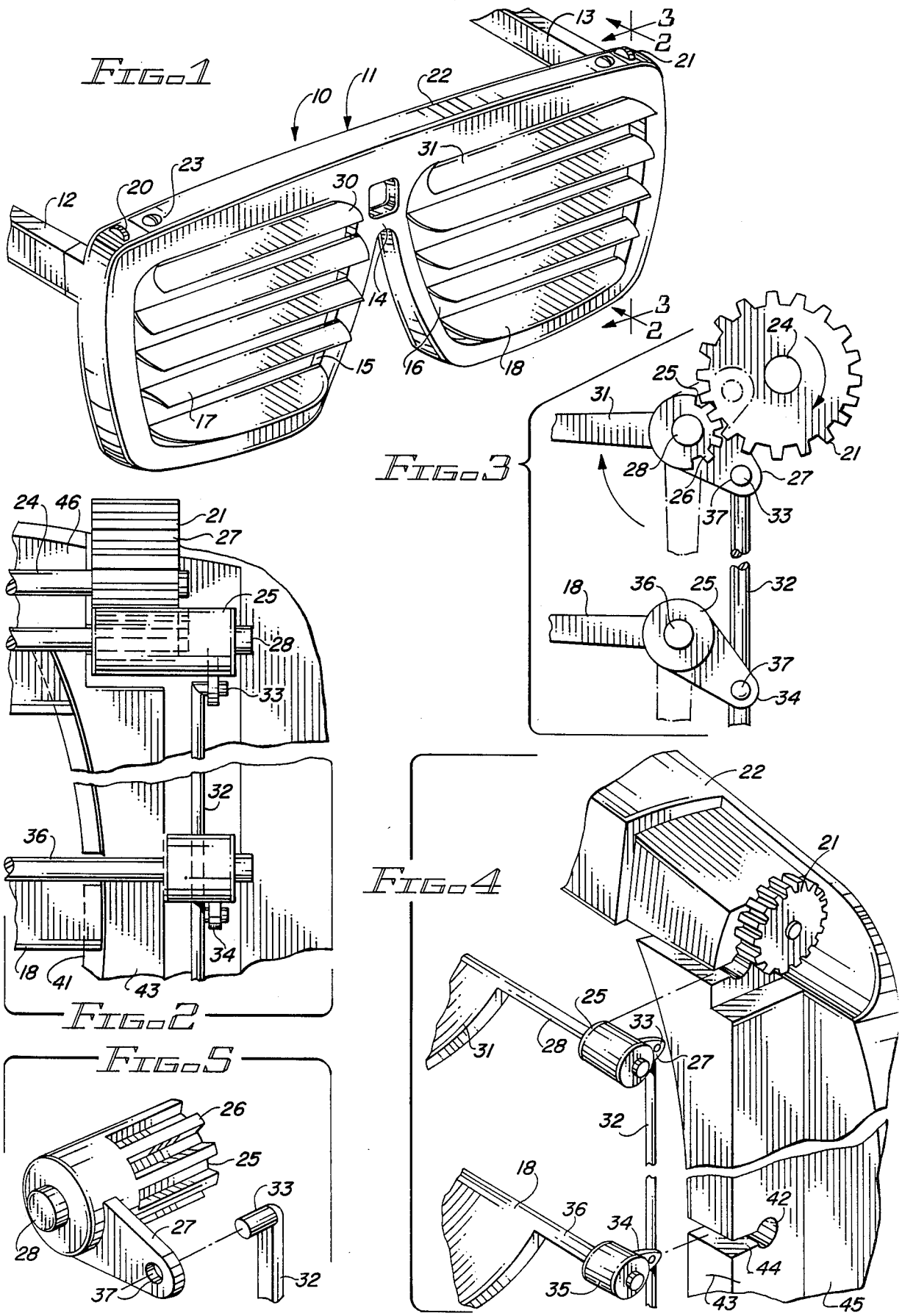

LOUVERED SUNGLASSES

BACKGROUND OF THE INVENTION

The present invention relates to sunglasses and especially to louvered sunglasses which are adjustable for different angles of the sun or other light source.

In the past, a wide variety of sunglasses have been provided for shading a person's eyes from the sun. Typically, sunglasses have a frame, such as a plastic or metal frame, having a front piece with two lens openings and connected by a bridge, and having a pair of tabs or nose pads positioned between the frame front piece lens openings. The frame also includes a pair of temple members which may be hinged with the hinge riveted between the temple and the front piece. In most sunglasses, colored lenses are used to filter out different light frequencies to shade the eyes and such tinted lenses may be of different colors and many be formed into prescription lenses for a specific individual to correct his vision. It has also been suggested in the past to shade the eyes with small louvers similar to venetian blind louvers which will block the sun at one angle while allowing visibility therethrough in the line of the vision of the eyes through the louvers.

A typical prior art U.S. Patent can be seen in Des. Pat. No. 196,532 for a pair of louvered sunglasses. In U.S. Patent No. 2,983,271 to Beck, a surgical mask has louvers mounted at different angles. In the Driver U.S. Pat. No. 1,089,539, a light shield is provided having slats fixedly mounted in a pair of spectacles. In the U.S. Pat. No. 2,114,658 to Noffsinger, a pair of sun goggles is provided with a plurality of fixed and angled thin metal strips which are non-reflecting for blocking the sun. In the Hebrard U.S. Pat. No. 2,232,455, spectacles are provided with a plurality of angled parallel plane and horizontal slits formed therein to provide visibility at a certain angle while providing protection against intense light from other angles. In the Duncan U.S. Pat. No. 2,824,308, a louvered screen eyeglass is provided with a plurality of interconnected louvers which can be repositioned in either a horizontal or vertical direction. The louvers are interconnected with a wire fabric.

The present invention is similar to these prior art U.S. patents in utilizing a plurality of angled louvers for blocking the sun or other intense light in one direction while allowing visibility therethrough at other angles. The invention provides for one shaft connected to each of the louvers in each of the lens for simultaneously rotating the louvers to adjust the angle in accordance with the angle of the sun or intense light striking the face and includes the option to close the louvers to completely block all of the light passing through the lens opening of the eyeglass frames such as when sunning on the beach.

SUMMARY OF THE INVENTION

The present invention relates to a pair of louvered sunglasses which has a frame, such as a polymer frame, having a front piece with a pair of lens openings therein and a pair of temples attached to the front piece. A plurality of elongated louvers are horizontally mounted in each front piece opening with louver pins inserted into openings on each vertical side of each front piece opening. A louver rotating assembly is positioned vertically along one edge of each front piece opening and attached to each louver for rotating the louvers. The rotating assembly is attached to arms extending from each louver so that a sliding shuttle bar rotates each louver simultaneously. A rotatable shaft extends horizontally through the front piece of the frame and is operatively coupled to the louver rotating assembly for rotating the louvers responsive to rotation of the rotatable shaft so that a pair of sunglasses has adjustable louvers simultaneously adjustable by movement of a single shaft. A rotating shaft also has extending arms which connect to a sliding bar connected to each of the extending arms of each individual louver and may have a small gear on one end thereof for rotating the rotatable shaft to adjust the louvers.

BRIEF DESCRIPTION OF THE DRAWINGS

Other objects, features, and advantages of the present invention will be apparent from the written description and the drawings in which:

FIG. 1 is a perspective view of a pair of louvered sunglasses in accordance with the present invention;

FIG. 2 is a sectional view taken on the line 2—2 of FIG. 1;

FIG. 3 is a sectional view taken on the line 3—3 of FIG. 1;

FIG. 4 is an exploded perspective view of a portion of the operating mechanism for rotating the louvers of FIGS. 1-3; and FIG. 5 is an exploded perspective view of the rotating shaft gear and extending arm.

DESCRIPTION OF THE PREFERRED EMBODIMENT

Referring to the drawings and especially to FIG. 1, a pair of louvered sunglasses 10 are illustrated having a frame front piece 11 and a pair of temples 12 and 13. The front piece 11 has a bridge portion 14 and a pair of lens or eye openings 15 and 16. The opening 15 has a plurality of louvers 17 horizontally mounted therein while the opening 16 has a plurality of louvers 18 horizontally mounted therein. The louvers 17 and 18 are rotatably mounted to the front piece 11 by the rotation of the thumb gears 20 and 21 mounted at each end of the top bar 22 of the front piece 11. A threaded screw 23 can lock or unlock a shaft 14 rotated by either the thumb gear 21 or 20 which are attached to the shaft 24 at each end thereof. Each gear 20 and 21 is connected to a partial gear rack 25 for meshing with the gear teeth 26 thereon with the gear teeth 27 of the thumb wheel 21 rotating the member 25 to rotate an extending arm 27 attached to a shaft pin 28 on the uppermost louvers 30 and 31. A vertically siding link 32 has a plurality of horizontal protrusions 33, each interconnected to an extending arm 34, which is connected to a rotating sleeve 35 which in turn is attached to the shaft portion 36 of each of the louvers in the eyeglasses 10. Thus, rotating the thumb gear 21 in either direction rotates the shaft 24 and rotates the thumb gear 20 of the opposite side of the lens. Each of the thumb gears 21 rotates the gear rack 25 in either direction as shown in FIG. 3 to rotate the uppermost lever shaft 28 and thereby rotate the uppermost louver 31 and 30. Simultaneously, the uppermost louver rack 25 has an extending arm 27 with an aperture 37 therein supporting the horizontal protrusion 33 of the vertical link member 32. The vertical link member 32 then has a perpendicular protrusion 37 connecting each of a plurality of arms 34 connected to each of the louver sleeves 35 connected to each of the louver shafts 36 and to each of the louvers 18 and 17.

Thus, rotation of the gear 21 rotates the gear rack 25 to rotate the uppermost louvers 30 and 31 and to simultaneously rotate the extending arm 27 to move the shuttle member 32 in a vertical direction up or down to simultaneously interconnect all of the other louvers through their arms 34 and shafts 36 to rotate all of the louvers simultaneously. The louvers are specifically designed, as shown in FIG. 2, to have an overlapping edge 41 so that when all of the louvers are overlapped, they will block the leakage of the light from the edges to give a closer fit. In addition, each of the sleeves 35 fits in an opening 42 in the side members 43 along each opening 15 and 16 of the front piece 11 and each has a slot 44 extending thereinto and has a hollow shaft area 45 for the link member 32 to slide in to both protect the link and to hide it from visibility. In addition, a horizontal passageway 46 has a shaft 24 passing therethrough in the front piece 11 of the frame. A threaded screw 23 can be threaded against the shaft 24 to lock the louvers 17 and 18 in any fixed positioned desired including a closed position when the sunglasses are being stored. Sunglasses, as shown in FIGS. 1-5, can be utilized with or without lens located behind the louvers 17 and 18 as desired without departing from the spirit and scope of the invention. The lens mounted therein can be optionally of tinted glass and polymer and can be prescription lens for a particular individual as desired. However, the present invention is not to be construed as limited to the forms shown which are to be considered illustrative rather than restrictive.

I claim:

1. A pair of louvered sunglasses comprising:
a frame having a front piece with a pair of openings therein and a pair of temples attached to the front piece;
a plurality of elongated louvers horizontally mounted in said each front piece opening;
louver support means for rotatably supporting each said louver in each said front piece opening;
louver rotating means positioned vertically along one edge of each said front piece opening and attached to each said louver for rotating said louvers; and
a rotatable shaft extending horizontally through said front piece and operatively coupled to said louver rotating means for rotating said louvers responsive to rotation of said rotatable shaft whereby a pair of sunglasses has adjustable louvers simultaneously adjustable by movement of a single shaft.

2. A pair of louvered sun glasses in accordance with claim 1 in which said louver rotating means includes at least rotatable thumb wheel attached to said rotatable shaft and protruding through said frame whereby rotating said thumb wheel will rotate all louvers at the same time.

3. A pair of louvered sun glasses in accordance with claim 2 in which louver support means includes a shaft for each louver supported in said frame and supporting a louver thereon.

4. A pair of louvered sun glasses in accordance with claim 3 in which said rotatable shaft has a gear on one end thereof engaging a gear on one end of the the top louver support means support shafts for rotating said top louver shaft and louver upon rotation of said rotatable shaft.

5. A pair of louvered sun glasses in accordance with claim 4 in which each said louver support means shaft has an arm on one thereof and has a link connecting each arm with the next louver support means shaft arm whereby each louver support means shaft is rotated when each arm is rotated by the link connecting it to another louver support means shaft arm upon rotation of said top louver support means shaft with said rotatable shaft gear.

6. A pair of louvered sun glasses in accordance with claim 5 in which at least on screw is threaded into said frame front piece to lock said shaft in place when threaded thereupon to thereby lock said louvers in one position.

7. A pair of louvered sun glasses in accordance with claim 4 in which said gear on one end of the the top louver support means support shafts have a gear and an arm one one end thereof for rotating each said louver shaft and louver by moving the link connected to said arm to move the next louver shaft arm, link and louver shaft whenever said rotatable shaft is rotated. rotation of said rotatable shaft.

* * * * *